(12) United States Patent
Kim et al.

(10) Patent No.: US 8,971,191 B2
(45) Date of Patent: Mar. 3, 2015

(54) METHOD AND APPARATUS FOR DYNAMICALLY CHANGING THE MONITORING OF A CELLULAR DATA CONNECTION

(75) Inventors: Jin Kim, Kanata (CA); Asif Hossain, Kanata (CA); Denis Fedotenko, Waterloo (CA); David P. Ma, Ottawa (CA)

(73) Assignee: BlackBerry Limited, Waterloo (CA)

( * ) Notice: Subject to any disclaimer, the term of this patent is extended or adjusted under 35 U.S.C. 154(b) by 639 days.

(21) Appl. No.: 12/759,286

(22) Filed: Apr. 13, 2010

(65) Prior Publication Data

US 2011/0039529 A1 Feb. 17, 2011

Related U.S. Application Data

(60) Provisional application No. 61/233,332, filed on Aug. 12, 2009.

(51) Int. Cl.
*G01R 31/08* (2006.01)
*H04W 68/00* (2009.01)
*H04W 88/06* (2009.01)

(52) U.S. Cl.
CPC .............. *H04W 68/00* (2013.01); *H04W 88/06* (2013.01)
USPC ........................................................ 370/241

(58) Field of Classification Search
USPC ................. 370/329, 331, 431, 433, 464, 465; 455/436–448
See application file for complete search history.

(56) References Cited

U.S. PATENT DOCUMENTS

| 7,536,451 B2 | 5/2009 | Ahn et al. | |
|---|---|---|---|
| 2006/0045069 A1* | 3/2006 | Zehavi et al. | 370/352 |
| 2008/0113692 A1 | 5/2008 | Zhao et al. | |
| 2009/0059826 A1 | 3/2009 | Zhao et al. | |
| 2010/0246534 A1* | 9/2010 | Vargantwar et al. | 370/332 |
| 2011/0051703 A1* | 3/2011 | Fulknier et al. | 370/338 |

OTHER PUBLICATIONS

EP patent application No. 10159760.7, European Search Report dated Jul. 21, 2010.
Howardforms.com, "Extend Battery Life by Changing the Slot Cycle Index!", Various Comments, www.Howardforms.com/archive/topic/358638-1.html, Downloaded Aug. 13, 2009.
PDAphonehome.com, "Tweaking Tower Polling Interval for Fringe EVDO Users Improves 6700 Experience", Posted Dec. 1, 2005, www.PDAphonehome.com/forms/ppc-6700-XV6700/61293-tweaking-tower-polling-interval-fringe-EVDO-users-improves-6700-experience.html, Downloaded Aug. 13, 2009.
Techrepublic.com, "Mobile Wireless", Mar. 7, 2008, http://blogs.techrepublic.com.com/wireless/?cat=24, Downloaded Aug. 13, 2009.
Office Action, Canadian Patent Application No. 2,712,988, dated Nov. 21, 2013.

* cited by examiner

*Primary Examiner* — Jung-Jen Liu
(74) *Attorney, Agent, or Firm* — Moffat & Co.

(57) ABSTRACT

A method and apparatus for changing monitoring of a cellular data connection at a mobile device, the method checking, using a processor at the mobile device, whether the mobile device is connected to both the cellular data connection and an alternative data connection; and if yes, extending the slot cycle or suspending monitoring of a slot for the cellular data connection at the mobile device.

12 Claims, 4 Drawing Sheets

METHOD AND APPARATUS FOR DYNAMICALLY CHANGING THE MONITORING OF A CELLULAR DATA CONNECTION

RELATED APPLICATIONS

The present application claims priority from US provisional application No. 61/233,332, filed Aug. 12, 2009, the entire contents of which are incorporated herein by reference.

FIELD OF THE APPLICATION

The present application relates to a mobile device capable of communicating both over a cellular data connection and over an alternative data connection.

BACKGROUND

Mobile devices are increasingly becoming capable of communicating with various networks. This includes communication over cellular networks or over data networks such as WiFi or WiMAX. Further, some cellular networks include separate voice and data connections.

For example, the CDMA 1x/EVDO mobile system is a hybrid system that has evolved from the CDMA2000 system. EVDO stands for Evolution Data Only or Data Optimized and as suggested by this, is a data only system. EVDO systems generally allow a high transfer rate for data. Further, with a 1XEVDO System operating in hybrid mode, it is possible to receive circuit switched services, such as voice calls, even during an active data session in the EVDO System.

An always-on mobile device typically establishes and maintains a data connection over the cellular system to keep an Internet Protocol (IP) address for the mobile device, thereby permitting receipt of data quickly when data becomes available. In order to maintain the data connection and monitor for data, a frame or paging slot is designated between the network and the mobile device, which the mobile device monitors. The number of slots or frames between monitored slots or frames is the slot cycle.

BRIEF DESCRIPTION OF THE DRAWINGS

The present method and apparatus will be better understood with reference to the drawings in which.

DETAILED DESCRIPTION OF THE DRAWINGS

Figure 1:
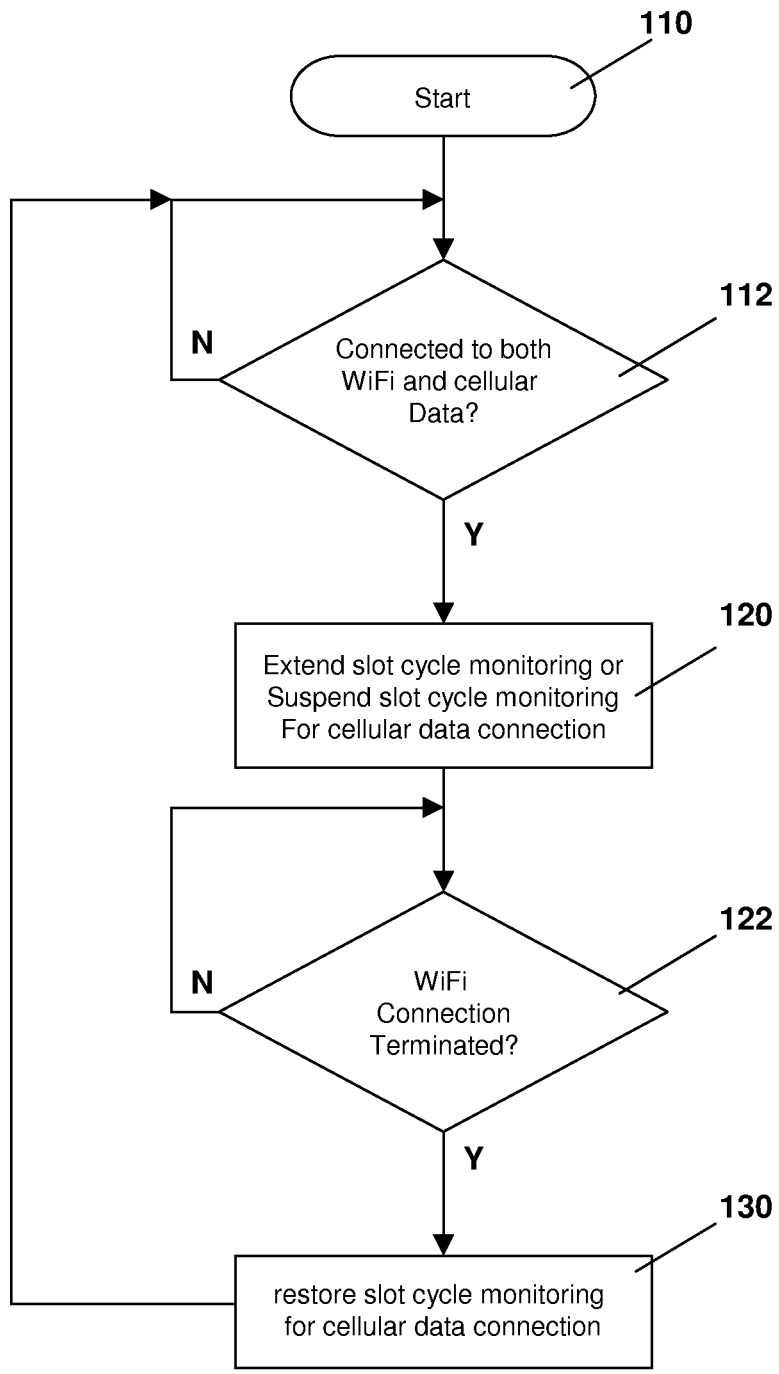
FIG. 1 is a flow diagram showing a method for suspending or extending a slot cycle.

The present disclosure provides a method for changing monitoring of a cellular data connection at a mobile device comprising: checking, using a processor at the mobile device, whether the mobile device is connected to both the cellular data connection and an alternative data connection; and if yes, extending the slot cycle or suspending monitoring of a slot for the cellular data connection at the mobile device.

The present disclosure further provides a mobile device configured to changing a slot cycle for a cellular data connection comprising: a cellular communications subsystem; an alternative data communications subsystem; and a processor, the processor, cellular communications subsystem and alternative data communications subsystem cooperating to: check whether the mobile device is connected to both the cellular data connection and an alternative data connection; and if yes, extend the slot cycle or suspend monitoring of a slot for the cellular data connection at the mobile device.

The present disclosure is described below with regard to the EVDO data only network. However, this is not meant to be limiting and the present disclosure could be used with any other data only cellular connection. An example of such an alternative connection could, for example, include an EDGE network. The present disclosure could further be used, for example, with a Long Term Evolution (LTE) or Long Term Evolution Advanced (LTE-A) network. Other examples of applicable networks would be known to those skilled in the art.

A data cellular connection such as EVDO requires the monitoring of a paging channel slot for Always On applications such as email. In EVDO, the monitoring may, for example, occur every 5.12 seconds.

When a mobile device is capable of connecting to an alternative data network or data source then there may be no need to monitor the EVDO paging channel or the monitoring of the EVDO paging channel could be extended. For example, a device that can connect to both a WiFi access point and to the EVDO network may prefer to use the WiFi connection. The monitoring of the EVDO channel in this case becomes redundant, and the use of the radio to monitor the paging channel unnecessarily uses the battery of the mobile device, and further the use of the paging channel wastes network resources.

While the alternative data connection above is described herein as a WiFi connection connected through an access point, other alternative data connections are possible. For example, other data connections include, but are not limited to, WiMAX, a tethered connection if the device is connected through a USB port on a computer, a short range communication such as Bluetooth or short range infrared such as an IrDA connection. As will be appreciated by those skilled in the art, if communication occurs over USB, Bluetooth or IrDA, the device will need to register with a network to receive data through the computer connection. The present disclosure is not meant to be limited to any particular alternative data connection.

In an example, whenever a device is in WiFi coverage and has an IP over WiFi connection resulting in connectivity with a server for an Always On application, the device can then reduce the effect of the battery drain by either not monitoring the EVDO channel at all or extending the EVDO cycle slot to much larger value then the typical 5.12 seconds. For example, the EVDO slots likely can be extended to 40 seconds or more.

As will be appreciated, if the WiFi connection is terminated or without a WiFi connection and EVDO only, the device will need to monitor the EVDO in regular slot cycles for always on applications as the device may receive incoming packets from the server.

Reference is now made to FIG. 1, FIG. 1 illustrates a flow diagram for a process in accordance with the present disclosure. The process of FIG. 1 starts at block 110 and proceeds to block 112 in which a check is made to determine whether or not the device is connected to both a cellular data connection and an alternative data connection such as WiFi. If not, the process continues to loop to block 112 in which a check is made to determine whether there is both a WiFi and cellular data connection.

From block 112, if both a WiFi and cellular data connection exists, the process proceeds to block 120 in which the slot cycle for the cellular data connection is either extended or the monitoring of the slot for the cellular data connection is suspended.

As will be appreciated by those skilled in the art, the extension of the slot cycle may be accomplished in various ways. In one example, the mobile device may send a request to a network element asking the network element to extend the slot cycle. In this way, the mobile device and the network element are synchronized with regard to communications through slots on the data connection. The request may be sent over either the cellular data connection or the alternative data connection.

The process then proceeds to block 122 in which a check is made to determine whether the data connection (such as the WiFi connection) has been terminated. If no, the process loops back to block 122 to continue to determine whether or not the WiFi connection has been terminated.

From block 122, if the WiFi connection has been terminated, the process proceeds to block 130 in which the cellular data connection slot cycle monitoring is restored.

From block 130 the process loops to block 112 in which a check is made to determine whether both WiFi and the cellular data connections exist.

As seen from FIG. 1, if the WiFi and the EVDO or other cellular data connection is established, the process allows the mobile device to either extend the monitoring of the slot cycle for the cellular data connection or to suspend the monitoring of the paging slot for the cellular data connection until the WiFi connection is dropped.

While the process of FIG. 1 provides a general solution, in some cases, services may require a connection over the cellular data connection. One such service is VCast™ for Verizon™, which requires connection over a cellular data connection such as EVDO.

Figure 2:
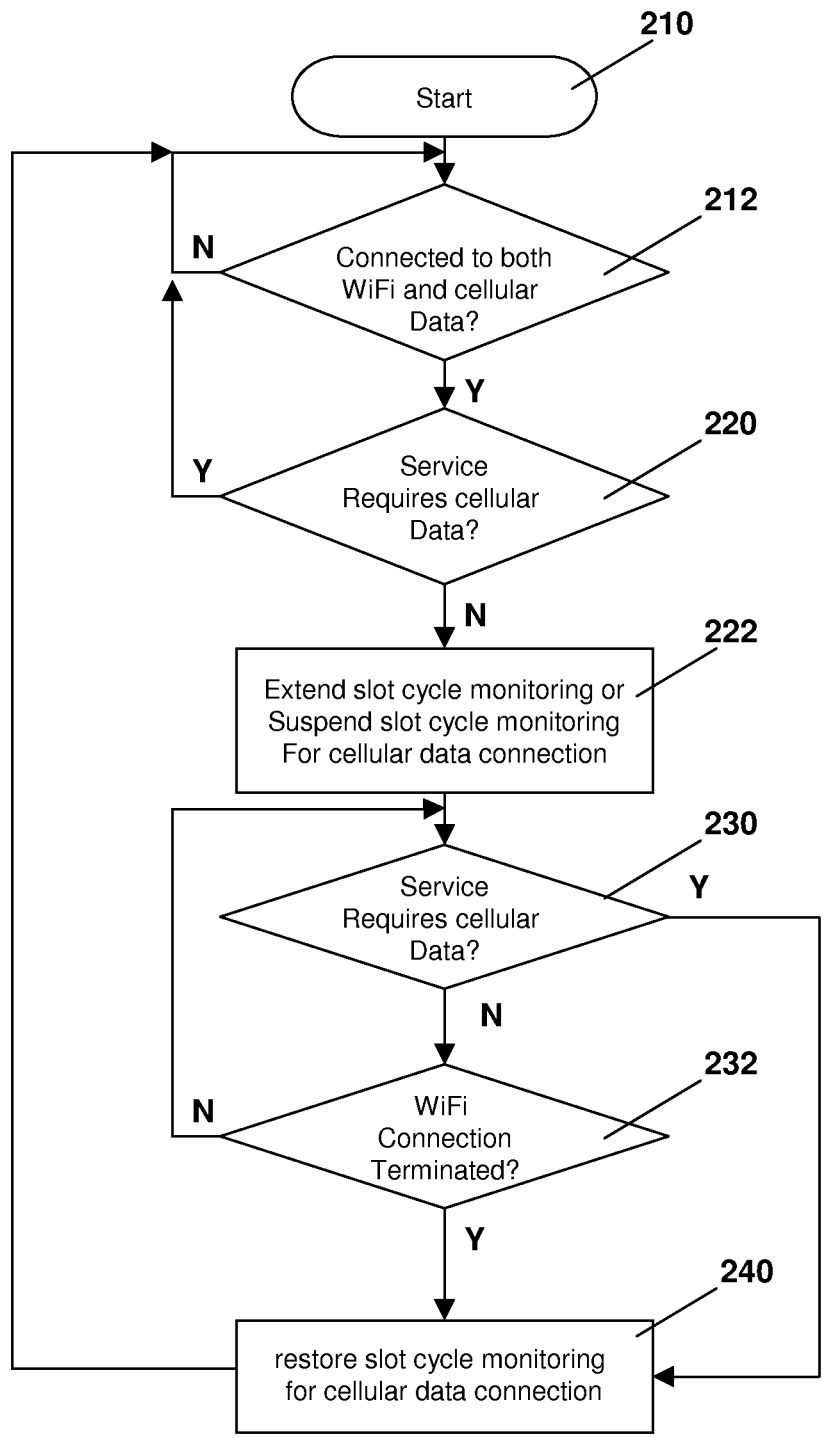
FIG. 2 is a flow diagram showing an alternative method in which an application or service on the device may require a cellular data connection.

Reference is now made to FIG. 2. FIG. 2 shows an alternative embodiment in which an application or service needs a cellular data connection.

Specifically, the process starts at block 210 and proceeds to block 212 in which a check is made to determine whether or not both the WiFi and the cellular data connections are established. If no, the process loops back to block 212 and waits for both the WiFi and cellular data connections to be established.

Once both WiFi and cellular data are established, the process proceeds to block 220 in which a check is made to determine whether an application or service on the mobile device needs the cellular data connection. If yes, the process proceeds to block 212 and continues to loop between block 212 and 220 until either one of the WiFi or cellular data connection is dropped or until the application or service no longer needs the cellular data connection.

As will be appreciated by those skilled in the art, the check of block 220 may involve the use of a linger timer to ensure that an application requiring the cellular data connection is truly finished. This ensures that if an application requests cellular data immediately after indicating it is finished the cellular data transaction, the radio software entity can avoid having to ping pong between a long or suspended state and regular slot cycle monitoring.

Thus, in block 220, the linger timer may be utilized in situations where the cellular data slot cycle has not been extended while waiting for an application to finish with the cellular data connection.

If, in block 220, it is determined that the application does not need a cellular data connection, the process proceeds to block 222 in which the cellular data connection slot cycle monitoring is either extended or suspended.

From block 222, the process proceeds to block 230 in which a check is made to determine whether an application or service needs the cellular data connection. As will be appreciated, in some cases, an application may be started after the slot cycle has either been extended for the cellular data connection or the monitoring of the slot for the data connection has been suspended in block 222. In this case, block 230 catches the starting of the application or service that needs the cellular data connection.

If it is determined in block 230 that an application or service needs a cellular data connection, the process proceeds to block 240 and restores the cellular data connection. From block 240, the process proceeds back to block 212 to determine whether or not the connection exists for both the WiFi and the cellular data connection.

From block 230, if an application or service does not need the cellular data connection, the process proceeds to block 232 in which a check is made to determine whether or not the WiFi connection has been terminated. If no, the process proceeds back to block 230.

From block 232, if the check determines that the WiFi connection has been terminated, the process proceeds to block 240 and the monitoring of the slot cycle is restored for the cellular data connection.

As indicated above, from block 240, the process proceeds to block 212 to continue to check whether or not a connection exists to both the WiFi and the cellular data network.

The above therefore provides for the extending of a cellular data slot cycle or the suspension of the monitoring of the cellular data slot in the case where an alternative data connection besides a cellular data connection exists. The alternative data connection is described above as WiFi. However this is not limiting and other alternative data connections such as those described above may be utilized. Thus, for example, if the mobile device is capable of receiving data over a Bluetooth connection, the methods of FIG. 1 or 2 could be implemented over Bluetooth rather than WiFi.

Figure 3:
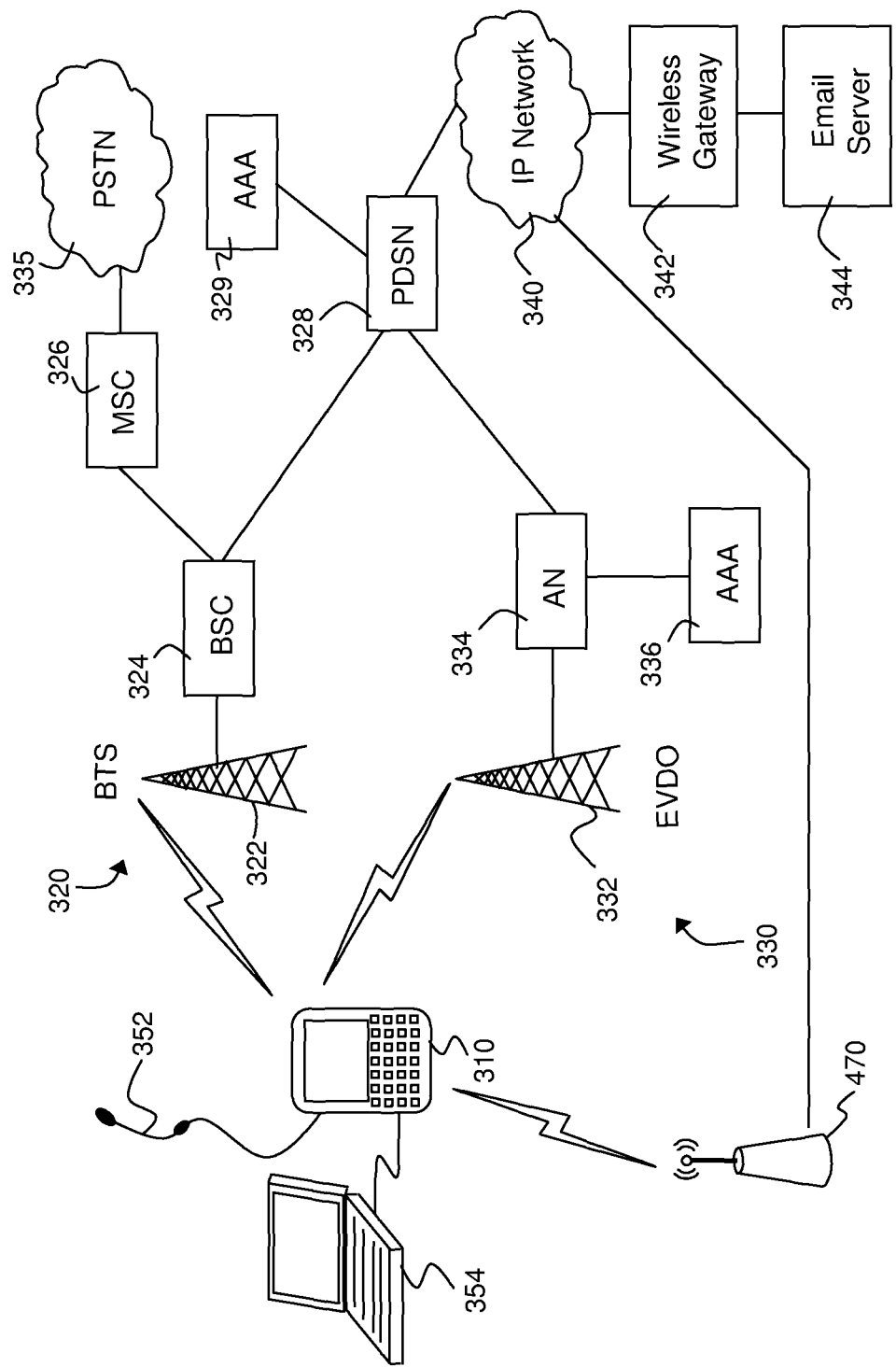
FIG. 3 is a block diagram showing an exemplary EVDO hybrid network.

Reference is now made to FIG. 3. FIG. 3 is a block diagram of an exemplary wireless data network in accordance with the present disclosure and with which the various embodiments of the method of the instant disclosure may cooperate. FIG. 3 shows a block diagram of a mobile device 310 and exemplary CDMA 1x network 320, an exemplary EVDO network 330, a public switched telephone network (PSTN) 335, a data network 340, wireless gateway 342 and e-mail server 344. The mobile device 310 is typically a two-way communication device having data and voice communication capabilities. FIG. 3 further shows an access point 470 for use with an alternative data connection such as a WiFi connection.

CDMA network 320 is comprised of a base transceiver station (BTS) 322 and a base station controller (BSC) 324. Base station controller 324 communicates with a mobile switching centre 326 which, as will be appreciated, is a circuit switched only component communicating with PSTN 335. Base station controller 324 further communicates with a packet data serving node (PDSN) 328 which is a packet switched only component. PDSN 328 further communicates with IP network 340.

EVDO network 330 contains an EVDO sector 332 which communicates with access node (AN) 334. Since the EVDO network 330 is a data only network, access node 334 communicates only with PDSN 328 and not with any circuit switch components.

An authentication, authorization and accounting node 336 is associated with AN 334, and a similar node 329 is associated with PDSN 328.

Operationally, mobile device 310 communicates wirelessly with CDMA network 320 using BTS 322 and BSC 324 to gain access to the CDMA 1x network.

Mobile device 310 sends and receives both data and voice services through CDMA network 320 until an EVDO network connection with established. Base station controller 324 communicates with circuit switched services provided by MSC 326 such as voice and short message service (SMS) via PSTN 335.

Prior to an EVDO connection being established, mobile device 310 further communicates wirelessly with BTS 322 and BSC 324 to gain access to packet data services provided by PDSN 328, such as e-mail, wireless application protocol (WAP) and other data services via data network 340. Such services are provided through wireless gateway 342 and servers such as e-mail server 344.

Once a network connection is established with CDMA 1x network 320 and the mobile device enters CDMA 1x idle state, wireless device 310 establishes a connection with EVDO network 330. This is done through EVDO sector 332 and AN 334. In this way, mobile device 310 gains access to packet data services provided by PDSN 328 using EVDO network 330. Subsequent to the establishment of an EVDO network connection with mobile device 310, CDMA network 320 is used to provide circuit switched services such as voice and SMS while EVDO network 330 is used to provide packet data services such as e-mail and WAP.

As will be appreciated by those skilled in the art, wireless device 310 can include voice communication means such as a headpiece 352 or a user can communicate directly into the wireless device 310.

Further, due to high transfer rates associated with EVDO networks, wireless device 310 can be used as a wireless modem and be connected through various means such as a USB or other serial port, or by short range wireless communications with a computer 354. Computer 354 can then gain access to data network 340 through EVDO network 330 using mobile device 310 as the modem.

Mobile device 310 may further have capabilities to communicate through access point 470 using, for example, WiFi. Access point 470 connects to a data network 340 and thus access to wireless gateway 342 and email server 344 are possible through access point 470.

Figure 4:
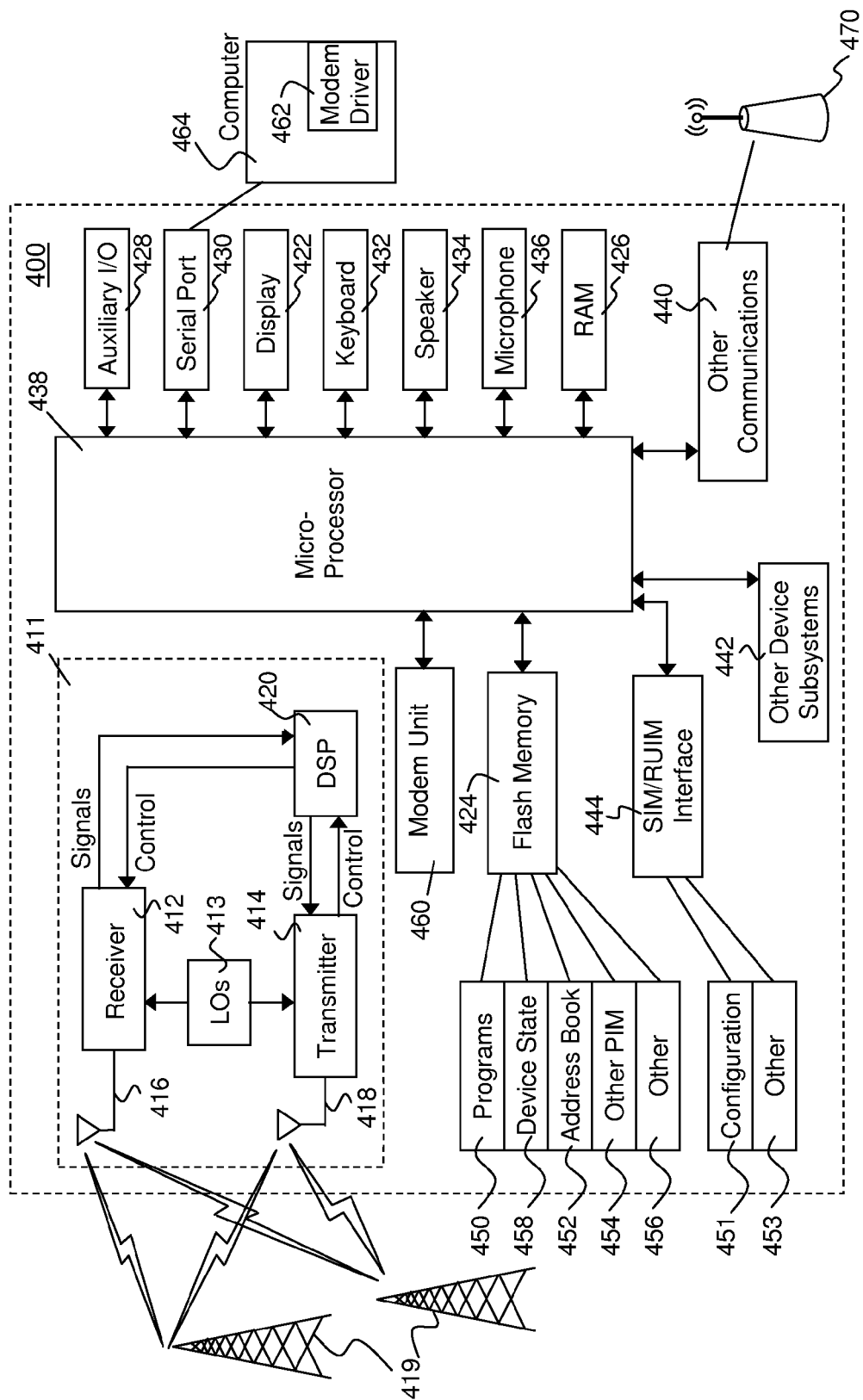
FIG. 4 is a block diagram of an exemplary mobile device that can be used in accordance with the present application.

Reference is now made to FIG. 4. FIG. 4 is a block diagram illustrating a mobile device capable of being used with various embodiments of the present disclosure. Mobile device 400 is generally a two-way wireless communication device having at least voice and data communication capabilities. Mobile device 400 may have the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, or a data communication device, as examples.

Where mobile device 400 is enabled for two-way communication, it will generally incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. For example, mobile device 400 may include a communication subsystem 411 designed to operate within the CDMA 1x/EVDO hybrid system.

Network access requirements will also vary depending upon the type of network 419. In some CDMA networks network access is associated with a subscriber or user of mobile device 400. A CDMA mobile device may require a removable user identity module (RUIM) or a subscriber identity module (SIM) card in order to operate on a CDMA network. The SIM/RUIM interface 444 is normally similar to a card-slot into which a SIM/RUIM card can be inserted and ejected like a diskette or PCMCIA card. The SIM/RUIM card can have memory and hold key configuration 451, and other information 453 such as identification, and subscriber related information.

When required network registration or activation procedures have been completed, mobile device 400 may send and receive communication signals over the network 419. As illustrated in FIG. 4, network 19 can consist of multiple base stations communicating with the mobile device. For example, in a hybrid CDMA 1x EVDO system, a CDMA base station and an EVDO base station communicate with the mobile device and the mobile device is connected to both simultaneously. The EVDO and CDMA 1x base stations use different paging slots to communicate with the mobile device.

Signals received by antenna 416 through communication network 419 are input to receiver 412, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile device 400 typically includes a processor or microprocessor 438 which controls the overall operation of the device. Communication functions, including at least data and voice communications, are performed through communication subsystem 411. Processor or microprocessor 438 also interacts with further device subsystems such as the display 422, flash memory 424, random access memory (RAM) 426, auxiliary input/output (I/O) subsystems 428, serial port 430, two or more keyboards or keypads 432, speaker 434, microphone 436, other communication subsystem 440 such as a short-range communications subsystem or WiFi or WiMax communications and any other device subsystems generally designated as 442. If other communications 440 are WiFi or WiMAX, the communications utilize a communication subsystem such as communication subsystem 411 to communicate with an access point 470. Processor 438 could execute code to suspend or extend a slot cycle for a cellular data connection.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 may be stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, may enable execution of software applications on the mobile device. A predetermined set of applications that control basic operations, including data and voice communication applications for example, can be installed on mobile device 400 during manufacturing.

One software application may be a personal information manager (PIM) application having the ability to organize and manage data items relating to the user of the mobile device such as, but not limited to, e-mail, calendar events, voice mails, appointments, and task items. One or more memory stores may be available on the mobile device to facilitate storage of PIM data items. Such PIM application may have the ability to send and receive data items, via the wireless network 419. In one embodiment, the PIM data items are seamlessly integrated, synchronized and updated, via the wireless network 419 or access point 470, with the mobile device user's corresponding data items stored or associated with a host computer system. Further applications may also be loaded onto the mobile device 400 through the network 419 or access point 470, an auxiliary I/O subsystem 428, serial port 430, short-range communications subsystem 440 or any other suitable subsystem 442, and installed by a user in the RAM 426 or a non-volatile store (not shown) for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the mobile device 400.

In a data communication mode, a received signal such as a text message or web page download is processed by the communication subsystem 411 and input to the microprocessor 438, which then further processes the received signal for output to the display 422, or alternatively to an auxiliary I/O device 428. A user of mobile device 400 may also compose data items such as email messages for example, using the keyboard 432, may be a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile device 400 is similar, except that received signals would be generally output to a speaker 434 and signals for transmission would be generated by a microphone 436. Alternative voice or audio I/O subsystems, such as a voice message recording subsystem, may also be implemented on mobile device 400. Although voice or audio signal output is usually accomplished primarily through the speaker 434, display 422 may also be used to provide an indication of the identity of a calling party, the duration of a voice call, or other voice call related information for example.

Serial port 430 in FIG. 4, may be implemented in a personal digital assistant (PDA)-type mobile device for which synchronization with a user's desktop computer (not shown). Such a port 430 would enable a user to set preferences through an external device or software application and would extend the capabilities of mobile device 400 by providing for information or software downloads to mobile device 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the mobile device to a computer to act as a modem. A modem unit 460 interacts with a driver 462 in a computer 464 to allow data transfer through the mobile device. With EVDO networks, a high rate of data transfer can be achieved using the mobile device 400 as the modem.

Other communications subsystems 440, such as a short-range communications subsystem, is a further optional component which may provide for communication between mobile device 400 and different systems or devices, which need not necessarily be similar devices. For example, the subsystem 440 may include an infrared device and associated circuits and components or a Bluetooth™ communication module to provide for communication with similarly enabled systems and devices.

Thus, mobile device 400 could implement the process of FIG. 1 or 2. For example, in one embodiment processor 438 could check whether the mobile is connected with a cellular data connection utilizing communications subsystem 411 and could further check whether an alternative data connection exists, for example utilizing other communications block 440, modem unit 460, auxiliary I/O 428, serial port 430 or other device subsystems 442. The communications subsystem 411 and processor 438 could be used to extend the slot cycle or a receiver of communications subsystem 411 could be turned off to suspend monitoring of the slot if the alternative data connection exists.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for changing monitoring of a cellular data connection at a mobile device comprising:
   checking, using a processor at the mobile device, whether the mobile device is connected to both the cellular data connection and an alternative data connection; and
   if the mobile device is connected to both the cellular data connection and the alternative data connection, determining whether a service or application on the mobile device requires the cellular data connection, wherein the determining uses a linger timer to ensure the service or application is finished with the cellular data connection;

if the service or application does not require the cellular data connection,
  extending a slot cycle or suspending monitoring of a slot for the cellular data connection at the mobile device;
  periodically checking whether:
    a) the service or application requires the cellular data connection; and
    b) the alternative data connection has been terminated; and
  if the service or application requires the cellular data connection, or if the alternative data connection has been terminated, restoring the slot, cycle or monitoring of the slot for the cellular data connection.

2. The method of claim 1, wherein the extending is performed based on a request to a network element to extend the slot cycle.

3. The method of claim 1, Wherein the cellular data connection is an Evolution Data Only connection.

4. The method of claim 1, wherein the alternative data connection is a wireless fidelity or WiMAX connection.

5. A mobile device configured to changing a slot cycle for a cellular data connection comprising:
  a cellular communications subsystem;
  an alternative data communications subsystem; and
  a processor,
  the processor, cellular communications subsystem and alternative data communications subsystem cooperating to:
    cheek whether the mobile device is connected to both the cellular data connection and an alternative data connection; and
    if the mobile device is connected to both the cellular data connection and the alternative data connection, determine whether a service or application on the mobile device requires the cellular data connection, wherein the determining uses a linger timer to ensure the service or application is finished with the cellular data connection;
    if the service or application does not require the cellular data connection,
      extend a slot cycle or suspend monitoring of a slot for the cellular data connection at the mobile device;
      periodically check whether:
        a) the service or application requires the cellular data connection; and
        b) the alternative data connection has been terminated; and
      if the service or application requires the cellular data connection or if the alternative data connection has been terminated, restore the slot cycle or monitoring of the slot for the cellular data connection.

6. The mobile device of claim 5, wherein the mobile device is configured to request that a network element extend the slot cycle.

7. The mobile device of claim 5, wherein the cellular communications subsystem is configured for communication over an Evolution Data Only connection.

8. The mobile device of claim 5, wherein the alternative data communications subsystem is configured for communication over a wireless fidelity or WiMAX connection.

9. A non-transitory, tangible computer readable medium storing instructions for execution by a processor of a mobile device, the instructions comprising code for:
  checking whether the mobile device is connected to both a cellular data connection and an alternative data connection; and
  if the mobile device is connected to both the cellular data connection and the alternative data connection, determining whether a service or application on the mobile device requires the cellular data connection, wherein the determining uses a linger timer to ensure the service or application is finished with the cellular data connection;
  if the service or application does not require the cellular data connection,
    extending a slot cycle or suspending monitoring of a slot for the cellular data connection at the mobile device;
    periodically checking, whether:
      a) the service or application requires the cellular data connection; and
      b) the alternative data connection has been terminated; and
    if the service or application requires the cellular data connection, or if the alternative data connection has been terminated, restoring the slot cycle or monitoring of the slot for the cellular data connection.

10. The non-transitory, tangible computer readable medium of claim 9, wherein the extending is performed based on a request to a network element to extend the slot cycle.

11. The non-transitory, tangible computer readable medium of claim 9, wherein the cellular data connection is an Evolution Data Only connection.

12. The non-transitory, tangible computer readable medium of claim 9, wherein the alternative data connection is a wireless fidelity or WiMAX connection.

* * * * *